Jan. 22, 1963 W. T. SEVALD 3,074,698
HUMIDIFIER
Filed Feb. 26, 1960 5 Sheets-Sheet 1
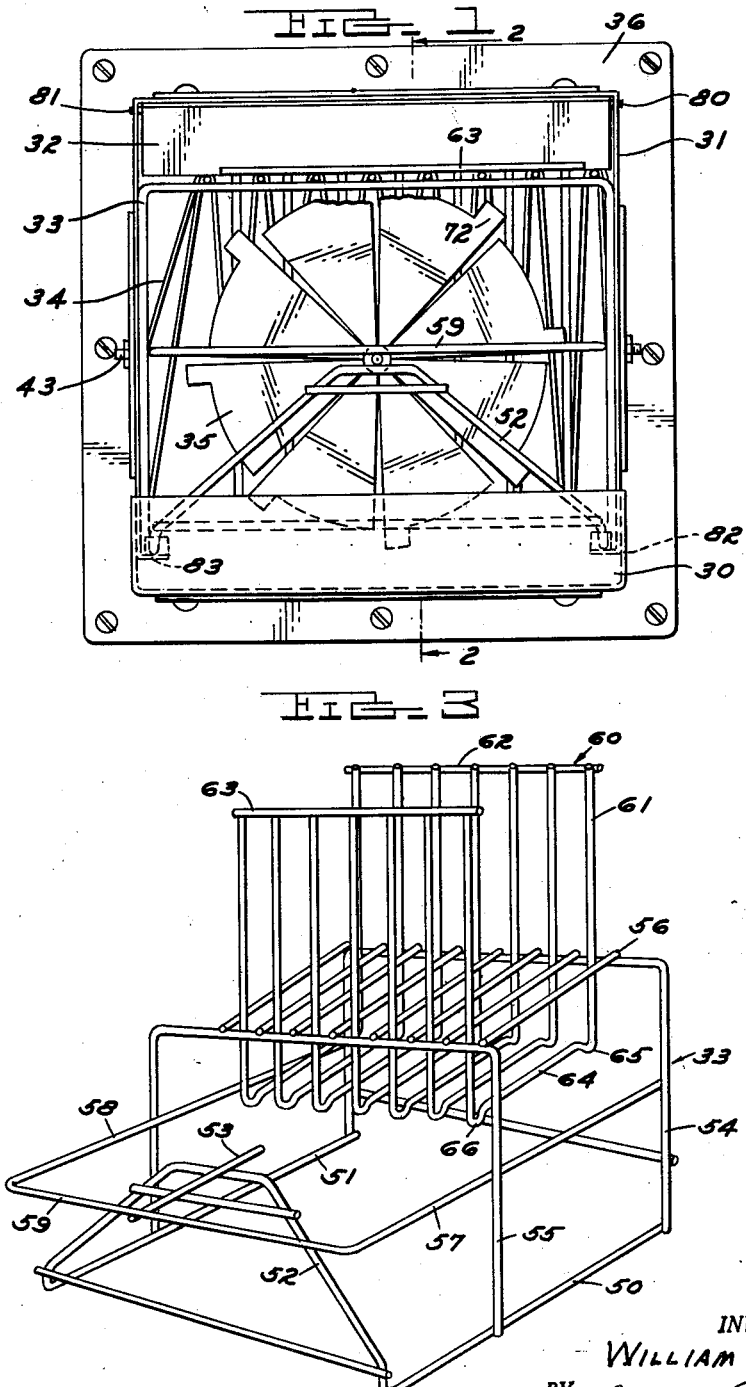
INVENTOR.
WILLIAM T. SEVALD
BY
ATTORNEY

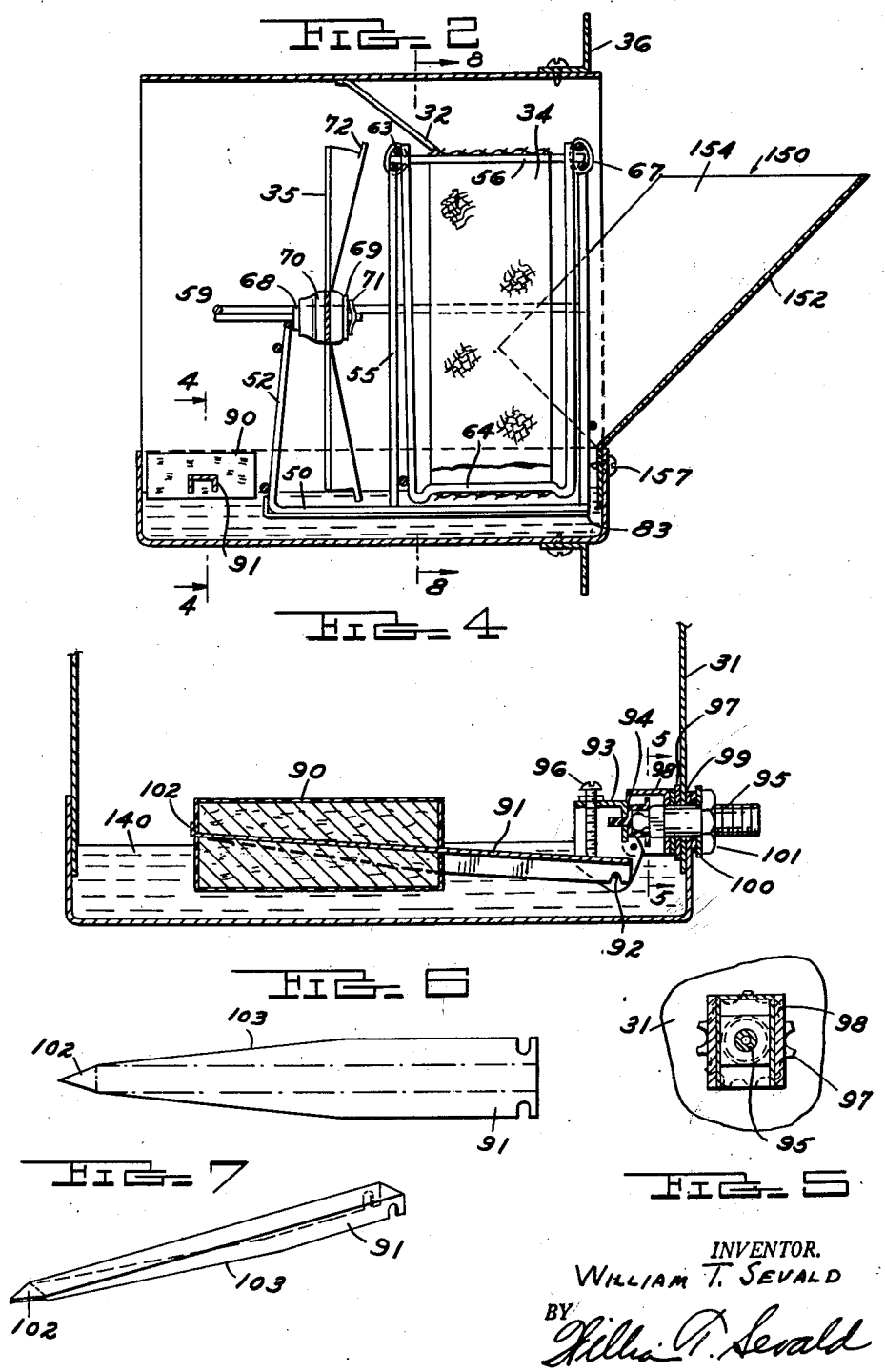

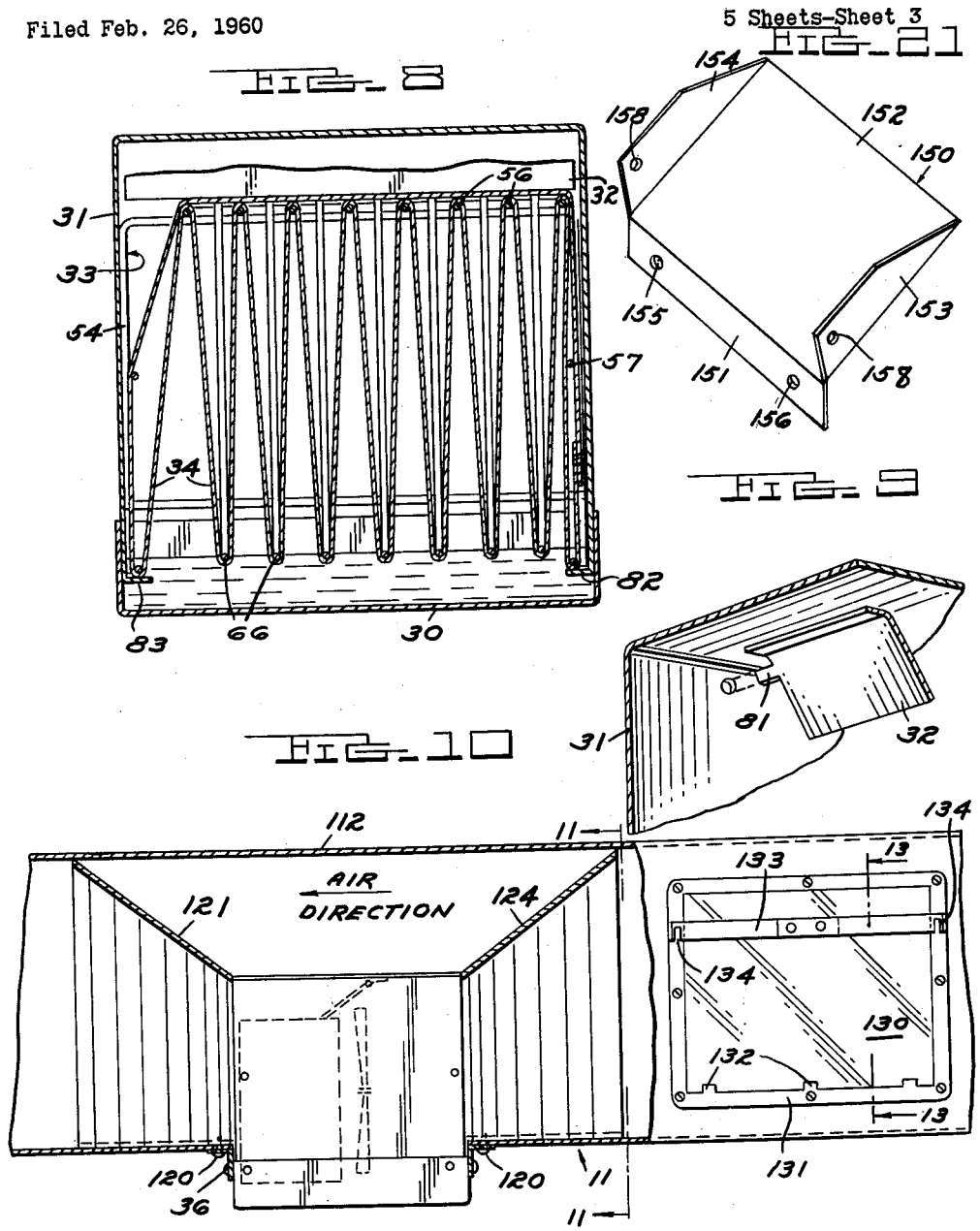

Jan. 22, 1963 W. T. SEVALD 3,074,698
HUMIDIFIER
Filed Feb. 26, 1960 5 Sheets-Sheet 4
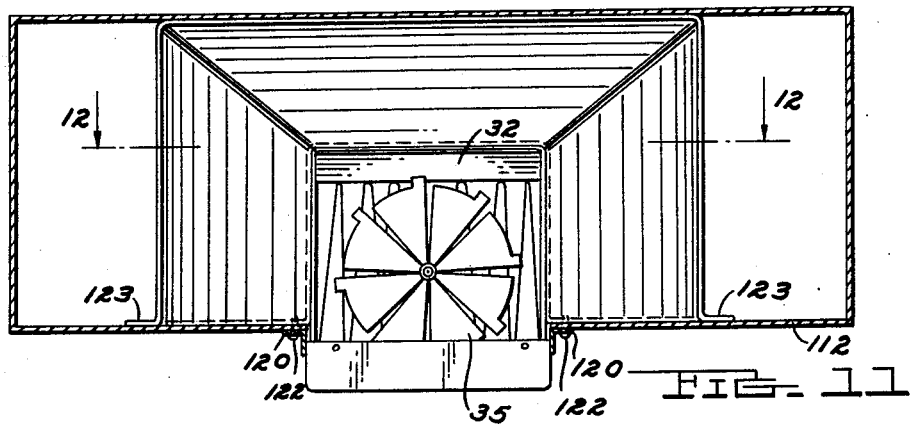
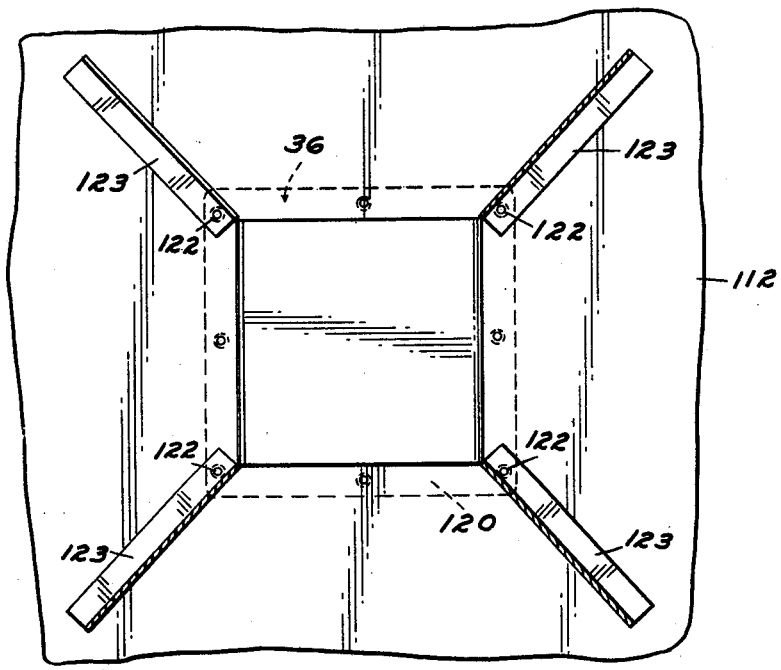
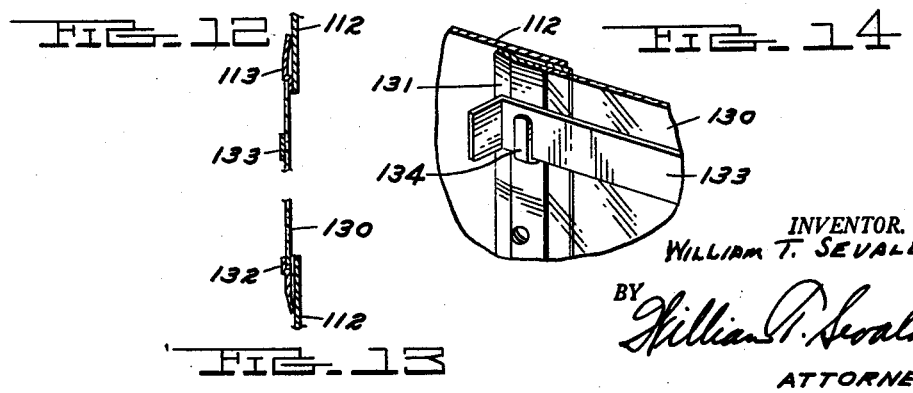
INVENTOR.
WILLIAM T. SEVALD
BY
ATTORNEY

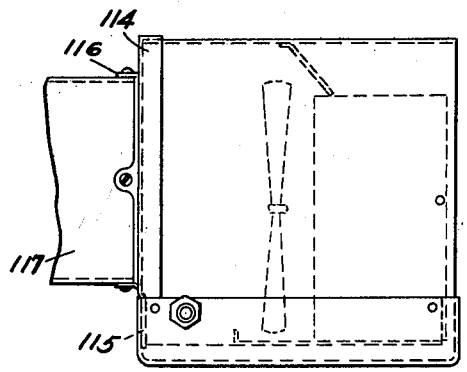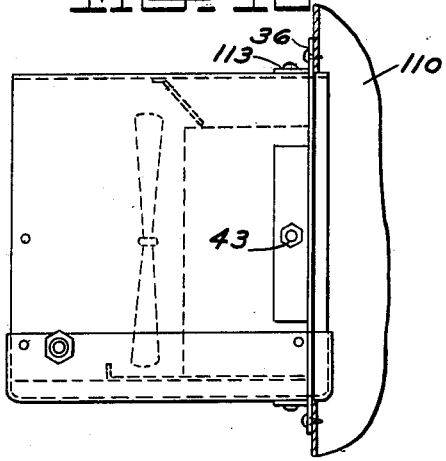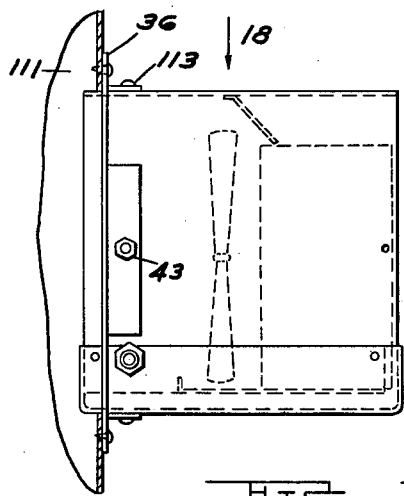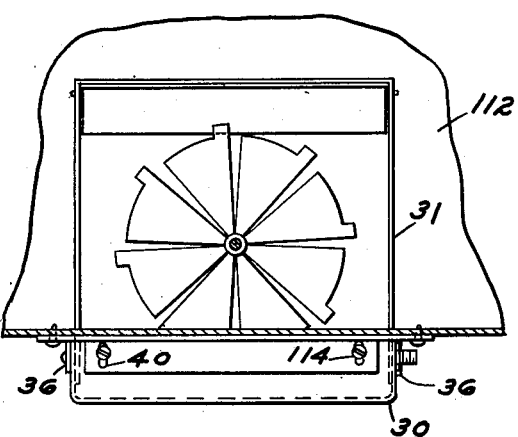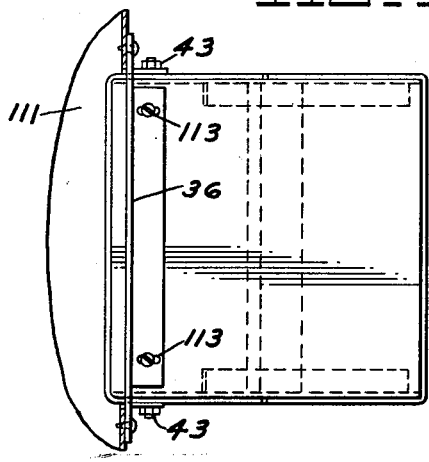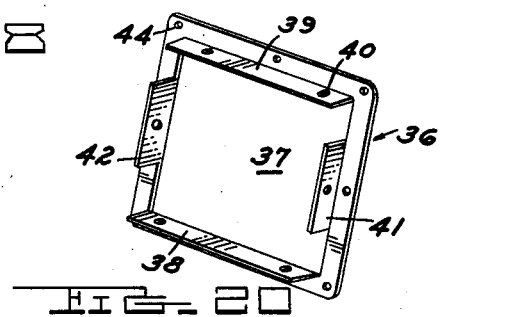

United States Patent Office 3,074,698
Patented Jan. 22, 1963

3,074,698
HUMIDIFIER
William T. Sevald, 1400 Cedarhill Drive,
Royal Oak, Mich.
Filed Feb. 26, 1960, Ser. No. 11,267
8 Claims. (Cl. 261—35)

This invention relates to humidifiers for forced hot air heating systems and more particularly pertains to a humidifier which operates automatically in conjunction with a forced hot air heating system and which can easily be integrated with the system and mounted on the plenums or ducts in and desired position or location, and which includes an air driven water wheel which raises the water to a slanting roof plate which in turn drains water on the evaporators providing water running down the evaporators for adequate humidification.

Various humidifying devices have been employed heretofore to attempt to provide adequate humidity for hot air heating systems, however, the several devices of the prior art have not proven entirely satisfactory inasmuch as they are complicated in design and construction, expensive to manufacture, difficult to use and unreliable and unsatisfactory in performance.

With the foregoing in view, the primary object of the invention is to provide a humidifier for force air furnaces which does not rely on capillary action to raise the water to the evaporator plates and which also does not project particulated or fog type water particles into the furnace system, the capillary action type of humidifier soon load with lime and minerals blocking the capillary action so that no moisture is provided; and the water particle projecting type throws water into the system whether or not humidity is required not only causing rusting out of the heating system, but also effecting circulation of lime and mineral dust in the system and building.

An object of the invention is to provide a water pan having a U-shaped shroud disposed thereover so as to channel the furnace air through the shroud above the water in the pan.

An object of the invention is to provide a downwardly inclined roof plate across the sides of the shroud for draining water downwardly on the evaporator members.

An object of the invention is to provide evaporator members within the shroud and pan below the roof plate for receiving down-running water to provide adequate free water for the air moving through the housing.

An object of the invention is to provide a fan water wheel driven by the air moving through the housing having tips adapted to raise the water to the roof plate.

An object of the invention is to provide a water level control means for controlling the level of the water in the pan so as to engage the fan tips.

An object of the invention is to provide a mounting frame which attaches to the humidifier pan and shroud either at the front, back, or bottom thereof for mounting the humidifier pan and shroud on furnace plenums and duct work in any desired position.

An object of the invention is to provide leveling means in conjunction with the mounting frame and humidifier pan and shroud for leveling the pan for carrying the water level therein.

An object of the invention is to provide a rack for supporting the evaporator members which is easily insertable and extractable from the pan and shroud.

An object of the invention is to provide a rack which not only supports the evaporator members but which also supports the fan water wheel.

An object of the invention is to provide an evaporator member spreader in conjunction with the rack for easily disposing the evaporator strips on the rack in a stretched, angulated, and inclined baffle relationship relative to the air moving therethrough.

An object of the invention is to provide the fan and evaporator members on the rack as to preserve their inter-relationship.

An object of the invention is to provided means in the housing and pan for mounting the rock, evaporator members thereon, and fan wheel thereon in proper relationship to the roof plate so as to accurately control their relationship thereto.

An object of the invention is to provide a novel float arm on a coated foam float which is easily insertable in and securely mountable on the float.

An object of the invention is to provide a humidifier which can be mounted on the cold-low pressure side of a furnace system and operated by atmospheric pressure driving air through the housing.

An object of the invention is to provide a hood on the outer end or front of the humidifier for cross- connecting the humidifier to the hot-high pressure side of the system.

An object of the invention is to provide means for mounting the humidifier on the hot-high pressure side of the system so that air moves outwardly through the humidifier operating same.

An object of the invention is to provide means for mounting the humidifier "in-line" a duct or trunk-line so that the air going therethrough operates the humidifier.

An object of the invention is to provide compressor and expander venturi cones for use with "in-line" mountings which are easily mountable in the duct work fore and aft of the humidifier shroud for increasing the velocity of the air in the humidifier area which cones are suitable for use in extremely large ducts or in ducts where the air moves relatively slower than normal.

An object of the invention is to provide an inspection window easily mountable and de-mountable on the duct for checking the operation of the humidifier, the water level adjustment, and the fan-water pumping action.

These and other objects of the invention will become more apparent by reference to the following description of a humidifier embodying the inventions taken in connection with the accompanying drawings in which:

FIG. 1 is a face elevational view of the humidifier showing the mounting frame vertically positioned.

FIG. 2 is a cross-sectional view of FIG. 1 taken on the line 2—2 thereof.

FIG. 3 is a perspective view of the rack and spreader with the spreader partially inserted in the rack; the evaporator stripping and fan deleted to better illustrate the construction.

FIG. 4 is an enlarged cross-sectional view of FIG. 2 taken on the line 4—4 thereof, partially broken away, illustrating the float valve arm and float construction.

FIG. 5 is a cross-sectional view of FIG. 4 taken on the line 5—5 thereof showing the valve orifice.

FIG. 6 is a plan view of the float arm blank prior to forming.

FIG. 7 is a perspective view of the formed float arm.

FIG. 8 is a cross-sectional view of FIG. 2 taken on the line 8—8 thereof.

FIG. 9 is a partial perspective view of the shroud and roof plate construction and mounting.

FIG. 10 is a cross-sectional view of the humidifier mounted in a duct showing the mounting frame horizontal, compressor and expander venturi cones fore and aft of the humidifier, and an inspection window for checking the operation of the device.

FIG. 11 is a cross-sectional view of the device seen in FIG. 10 taken on the line 11—11 thereof.

FIG. 12 is a cross-sectional view of the device seen in FIG. 11 taken on the line 12—12 thereof.

FIG. 13 is a cross-sectional view of the window area of FIG. 10 taken on the line 13—13 thereof.

FIG. 14 is a perspective partial view of the inspection window mounting frame, window, and securing bar relationship.

FIG. 15 is a side elevational view of the humidifier device showing a hood and pipe attachment.

FIG. 16 is a reduced side elevational view of the device in the position seen in FIG. 2 showing the vertical mounting and leveling means in more detail.

FIG. 17 is a view similar to FIG. 16 showing the device on a duct or plenum mounted at the front end.

FIG. 18 is a top elevational view of the device in FIG. 17 in the direction of the arrow 18.

FIG. 19 is a face elevational view partly in cross-section, similar to the showing of FIG. 11 showing the mounting frame horizontal leveling means.

FIG. 20 is a reduced perspective showing of the mounting frame which is used selectively on the back, front, or bottom of the device for mounting the device in the desired position; and FIG. 21 is a perspective view of the air chute shown in cross-section in FIG. 2 at the right end of the housing.

Referring now to the drawings wherein like numerals refer to like and corresponding parts throughout the several views, the humidifier, mounting means, and component parts disclosed therein to illustrate the invention comprising a water pan 30, an inverted U-shaped shroud 31 mounted over the pan 30 forming an air channel therethrough over the pan, a downwardly-rearwardly inclined roof plate 32 disposed across the top of the shroud 31 with its bottom edge adjacent the top of the rack 33 evaporator members 34 with the rack 33 disposed within the shroud and pan, a water wheel fan 35 rotatably mounted on the rack for engaging water in the pan 30 to raise same upwardly against the roof plate 32 so that water raised by the fan to the roof plate drains downwardly on to the evaporators 34 thereby providing downwardly running water on the evaporator members for imparting moisture to the air traveling through the shroud and over the pan, and a mounting frame 36 for universally adaptably mounting the device on a duct or plenum wall.

More particularly, the mounting frame 36, FIG. 20 has a central opening 37, for receiving the front, back, top, and/or bottom of the humidifier housing composed of a pan and shroud, paired flanges 38 and 39 having slots 40 formed therein for receiving sheet metal screws in adjustable relationship, FIG. 19, paired flanges 41 and 42 having apertures therein for receiving the pivot bolts 43. FIG. 17 for adjustably mounting the humidifier, and sheet metal crews apertures 44 in the peripheral frame portion for securing the mounting frame 36 on a duct or plenum.

The rack 33, FIG. 3, comprises paired base members 50 and 51 terminating upwardly at their front ends in the V-shaped support member 52 supporting the fan axle 53, inverted U-shaped paired riser members 54 and 55 welded to the base members 50 and 51, and cross bars 56 welded across the top web portions of the riser members 54 and 55 and it is to be noted that the cross bars 56 are angulated or off-set from front to back. The arms 57 and 58 are welded to the supports 54 and 55 at either side thereof and have a web member 59 across the front of the rack supporting and welded to the fan axle 53 at its projecting end.

The spreader 60 comprises spaced U-shaped members 61 welded at their upper ends to the paired cross-bars 62 and 63 with the U members having a foot web 64 located between projecting ends 65 and 66 for maintaining the evaporator stripping in the foot 64 area. FIG. 3 shows the spreader 60 partially inserted in the rack 33 and it will be understood that in annexing the evaporator stripping 34 to the rack 33 and spreader 60 that the spreader 60 is entirely removed from the rack 33 and the evaporator stripping 34 laid across the top of the cross bars 56; the spreader 60 is then pushed down from the top through the position seen in FIG. 3 to the position seen in FIGS. 1, 2 and 8 whereby the stripping is disposed between the cross-bars 56 on the rack and the cross feet 64 on the spreader and due to the fact that the cross-bars 56 and cross feet 64 are angled from front to back and staggered from side to side the evaporator webbing is disposed on an angle in the vertical plane and disposed on an angle in the horizontal plane providing angulated and inclined baffles for the air moving therethrough. The ends of the evaporator strips after the spreader 60 and rack 33 are integrated are initially placed downwardly from the outer bars 56 on the inside of the arms 57 and 58 and brought across the bottoms of the supports 50 and 51 and then brought upwardly over the top of the bars 56 until the ends meet whereupon they are stitched together securing the evaporator stripping on the rack and spreader and it is to be noted that the spreader and rack are hog ringed together by hog rings 67 so that the evaporator stripping 34 can be tensioned and stitched together without the spreader rising from the rack.

The water wheel fan 35, FIG. 2, has a hub 70 with an impressed nylon bearing surrounding the stainless steel axle 53 and washers 68 and 69 are disposed on either end of the hub 70 and a push-nut 71 gripping the end of the shaft 53 holds the fan in the assembled relationship on the shaft and it is to be noted that the fan 35 is provided with radially projecting tips 72 which are adapted to dip into the water in the pan 30 and raise same to the roof plate 32 from whence the water runs rearwardly and downwardly on to the evaporator 34.

The rack, spreader, evaporators, and fan wheel mounted thereon are easily inserted and extracted through either end of the housing regardless of which end the mounting frame 36 is thereto attached and since the roof plate 32 is pivotally mounted via its tab ends 80 and 81 being disposed in apertures of the shroud 31, it is obvious that the roof plate moves out of obstructing path to the entry or exit of the rack assembly by lying against the top or web portion of the shroud 31. The shroud is equipped with sidewise inwardly extending feet 82 and 83, FIG. 8, upon which the supports 50 and 51 of the rack rest to support the unit assembly within the housing composed of the shroud 31 and pan 30 and it is to be noted that the shroud 31 fits inside the pan 30 and is eyeleted thereto via coinciding apertures or spot welded as desired depending upon the material of which the various parts are made.

A suitable float valve, FIGS. 4 through 7, comprises a float 90 fixed on an arm 91 which is pivotally mounted on a pin 92 of the valve head 93 which supports the stopper 94 in line with the orifice of the fitting 95 and by turning the abutting screw 96 against the arm 91, that water level of the pan, the pressure on the head 93, and the water pressure in the fitting 95 can be adjusted so as to locate the water level in the pan at the correct height. A star lock washer 97 is disposed between the valve body 98 and the shroud side 31 and a leather sealing washer 99, compression washer 100, and jam nut 101 are disposed around the fitting 95 so as to firmly locate the float control valve in the proper vertical position. It is to be noted that the float arm 91, FIG. 6, in the blank plan view and in the full formed view of FIG. 7 has a pointed tip 102 and slanting side walls 103 back to a portion or area still within the float 90 so that the insertion of the arm 91 in the polystyrene or glass foam float 90 is easily accomplished by running the pointed tip through the float and then bending the pointed tip 102 against the float so as to prevent the float 90 from endwise moving off the outer end of the arm while the slanting side walls 103 engage the float body on the interior thereof and prevent movement of the float towards the valve thereby firmly and easily mounting the float on the arm.

Referring to FIGS. 15 through 20, the mounting frame 36 is securable to a cold air plenum or duct 110 FIG. 16, a hot air plenum or duct 111, FIGS. 17 and 18, or the bottom of a trunk line 112, FIGS. 19 and 10 through 12 with the humidifier housing annexable and mountable with leveling adjustment on the mounting frame in any of the stated positions or locations.

More particularly, FIG. 16, the cold air plenum or duct 110 has lower than atmospheric pressure so that atmospheric pressure drives air through the humidifier housing moving the fan to raise water to the roof plate so that it drains on the evaporators and in this embodiment the mounting frame 36 is screwed to the plenum 110 via sheet metal screws and the housing is mounted with the bolts 43 in a pivotal central position of the housing and frame which pivotal pan leveling adjustment is secured by the sheet metal screws 113 through the slots 40 attaching frame flange 39 so that the housing can be tilted on the bolts 43 and secured by the screws 113 and the slots 40 to make the pan level.

When the device is mounted on the hot air plenum 111, the higher than atmospheric pressure therein, FIGS. 17 and 18, blows air outwardly through the humidifier housing operating the fan to raise the water against the roof plate from which it drains on the evaporator strips and it is to be noted that the mounting frame 36 attaches to the end of the humidifier housing opposite that shown in FIG. 16 via the same means wherein the bolt 43 pivotally mounts the humidifier housing and the sheet metal screws 113 and the slots 40 of the flange 39 secure the adjusted relationship and it is obvious that the rack 33 assembly with the evaporators and fan can be inserted and extracted from the outer end of the housing as seen in FIGS. 16, 17 and 18. FIG. 15 shows the hood 114 located on the fan end of the humidifier housing and the hood has a depending plate 115 located within the pan and an aperture 116 for receiving the pipe 117 which can lead from a furnace, to a furnace, or between the hot high pressure side and the cold low pressure side of an individual furnace and that the hood 114 fits on either projecting end of the humidifier as seen in FIGS. 16, 17 and 18 so that the humidifier can be connected to other duct work or plenums as desired so as to dispose the interior of the housing and the evaporators to an accelerated air flow such as when the pipe 117 leads between the hot high pressure side and the cold low, pressure side of a furnace system. Obviously the pipe 117 can lead from a point adjacent the floor constituting a cold air return in the basement or furnace area if desired.

Referring to FIG. 19, the trunk line 112 has the mounting frame 36 screwed on the bottom thereof in the horizontal position and the humidifier housing is inserted therein from a position below that seen to the point at which it is shown whereby the user pushes the shroud 31 upwardly into the trunk line through the mounting frame 36 and then attaches the pan 30 to the mounting frame 36 via the apertures in the pan front and back and sheet metal screws 114 or machine screws and U-nuts (not shown) and the level of the pan is universally adjustable by loosening the sheet metal screws 114 in the slots 40, adjusting the pan level, and then tightening same to secure the pan 30 in the adjusted level position.

When the duct or trunk line 112 is exceptionally large or where the air velocity of the trunk line 112 is relatively slow it has been found practical to increase the air velocity in the area of the humidifier without obstruction or blocking the trunk line by use of venturi expander and compressor cones such as seen in FIGS. 10 through 12. In this modification, the aperture is cut in the bottom of the trunk line 112 and the mounting frame 36 secured thereto via the sheet metal screws 120 and the venturi compressor cone 124 is then passed up through the aperture in the mounting frame 36 and moved to the position seen in FIGS. 10-12 and it is to be noted that the cone has an apertured foot 123 aligned with the sheet metal screws 120 at either corner of the mounting frame 36 and the user then turns the screws 120 into the feet 123 of the compressor cone. The user then passes up the expander cone 120 through the central opening of the mounting frame 36 and locates the feet 123 thereof with their apertures 122 over the adjacent sheet metal screws 120 and then tightens the same in position.

The venturi cones are now mounted in position endwise outwardly of the aperture in the mounting frame 36 in trunk line 112 so that the user then pushes the humidifier housing upwardly through the mounting frame 36 to the position seen in FIG. 10-12 and then secures the sheet metal screws into the pan apertures as seen in FIG. 19, fixedly locating the humidifier in the desired position of the trunk line 112 between the expander venturi cone 121 and the compressor venturi cone 124 thereby increasing the velocity of the air through the humidifier without obstructing the trunk line 112.

A removable inspection and adjustment window 130 is provided with a mounting frame 131 having bottom holding tabs 132 and a cross bar 133 held in place by the fingers 134 and Plexiglas or regular glass is used for the window portion 130 and it is obvious that the window is easily removable and mountable via the bar 133 and the fingers 134. After lifting the window panel 130 out of position, the user can then reach through the window frame 131 and adjust the humidifier as desired. After the adjustment has been made he can then remount the window panel 130 and attach the bar 133.

It is further noted that the window pane panel 130 is placed adjacent the water supply end of the humidifier housing so that the user by placing his arm through the window mounting frame 131 can adjust the water level as desired and extract the rack from the housing for inspection and adjustment of the fan and evaporators.

While the venturi cones have been shown as occupying the full height of the trunk line 112 it is obvious that this is not a necessary condition as it is obvious that the trunk line can extend upwardly from the tops of the venturi cones if desired and the housing can be elevated to a higher position than shown in FIGS. 10 through 12 if desired such as to position the pan and shroud higher relative to the trunk line 112 such as seen in FIG. 19.

Referring to FIGS. 2 and 21, the air chute 150 has a depending lip 151 disposed inside the pan 30, a bottom 152 slanting upwardly outwardly, and sides 153 and 154 on either side of the bottom 152; apertures 155 and 156 are provided in the lip 151 for attachment to the pan 30 via the apertures therein via screws 157 and apertures 158 are provided in the sides 153 and 154 respectively for receiving the bolts 43 which attach the shroud 31 to the mounting frame 36 so that the chute 150 is easily attached to the pan 30 and shroud 31.

The chute 150 fits on the inner sides of the pan and shroud and is for use particularly when the device is mounted as in FIGS. 1, 2, 15 and 16 on the cold air return where atmospheric pressure drives air through the housing into the low-pressure side of a furnace system and due to the fact that the air is directed upwardly into the duct by the chute 150 an air-mixing action is caused thoroughly mixing the air coming from the humidifier with the air traveling in the duct. Also any water droplets driven off the evaporators by the air rushing past them is dropped out on the chute 150 and returned to the pan 30.

In assembling the inventive device the shroud 31 and pan 30 are formed and eyeleted together as shown with the roof panel 32 pivotally mounted between the sides of the shroud. The rack assembly is then assembled by placing the evaporator stripping 34 across the tops of the rack bars 56 and then, by depressing the spreader feet 64 through the rack 33 from a position above that seen in FIG. 3 to the position seen in FIGS. 2 and 8 it will be obvious that the evaporator stripping will be disposed in a senuous path between the spreader feet 64 and the rack bars 56 and the evaporator stripping ends are then dropped below the supports 50 and 51 brought back up until their ends meet at which point they are stitched together holding the stripping in stretched position and the hog rings 67, FIGS. 2, prevent the spreader 60 from rising under the tension due to the fact that the bars 62 and 63 on the spreader 60 hold the spreader down against any tension causing it to rise thereby fixedly tensioning the evaporator members between the rack and spreader.

The fan and washers are then placed on the shaft 53 and the push nut 71 fixed on the end thereof permitting free rotation of the fan and preventing same from accidental removal. The rack and spreader evaporator and fan assembly is then inserted in the housing by passing it through either open end thereof to where it locates itself on the steps 82 and 83 so as to locate the fan tips below the pre-determined desired water level.

The float valve assembly is then mounted in the pan aperture provided therefor as previously described, the float 90 and arm 91 are attached; conventional water connections via copper line, brass collars, and cap nuts attached to the fitting 95 supply water to the device and by manual adjustment of the adjusting screw 96 the water level 140 can be accurately controlled so as to submerge the fan tips 72 without submerging the fan blades thereby obviating any water interference with the speed of fan rotation.

In mounting the device, the particular location is selected as hereinbefore previously described and the aperture cut in the duct; the attaching frame is then secured thereto and the humidifier housing comprising the pan 30 and shroud 31 is then secured in position as previously described and a carpenter's spirit level is preferably used to level the pan in proper relationship and then the level adjusting screws are tightened and the device is then properly secured and mounted. The water connection from supply is then made to the fitting 19 and the device is ready to operate.

In operation, the float valve and float automatically regulate the proper water level 140 in the pan 30 as previously adjusted and when the furnace blower operates the air circulates in the furnace system blowing through the humidifier housing whereupon the fan water wheel 35 is driven by the air circulating therethrough so as to run its tips 72 through the water and throw same radially and more particularly upwardly against the rearwardly and downwardly slanting roof plate 32 which then drains the water projected thereon to the top of the humidifier strips whereupon the water runs down the humidifier webbing or strips so that they are thoroughly wet and it is to be noted that the fan water wheel 35 will deliver a copious amount of water against the roof plate 32 so that there is more than adequate supply of downwardly running water on the evaporator strips and this passes the water through the air coming therethrough and provides adequate free water on the evaporator strips for the air to take as desired. It is also obvious that the air moving through the housing moves through the wet evaporator strips thereby passing the air through the water as well as the water through the air.

The operation of the device is entirely automatic without electrical connections, humidistats, or plumbing drains and since the device does not depend on capillary action but rather pumps the water to the top of the evaporator strips via the water wheel fan no amount of calcification or liming of the evaporator strips will prevent proper humidification due to the fact that the water runs down on the outside of the evaporator strips in full air contact even if they are calcified or limed. It is also obvious that since the device does not project raw water into the duct work or furnace or plenums that no rusting or flooding of the duct work or furnace plenums can occur since the air will only take the amount of moisture from the evaporating strips that it can carry eliminating condensation in the furnace and in the duct work. It is also important to note that the water pan is always disposed outwardly of the plenum or duct work so that no flooding of the duct work can ocur in the event of overflow in the pan due to the fact that the pan is located outside the duct work or plenum.

The inventive humidifier with the mounting and adaptable features constitutes a compact, durable, and neat appearing humidifier easily mounted in a variety of positions as desired depending upon the furnace and heating system to which the humidifier is applied giving the applicator, heating contractor, or home-owner the adaptabiliy necessary in humidifiers relative to the various types of furnaces and furnace systems on the market and in homes at the present time.

Although but a single embodiment of the inventive humidifier has been shown and described in detail, it is obvious that many changes may be made in the size, shape, detail, and arrangement of the various elements of the invention within the scope of the inventive claims.

I claim:

1. A forced air humidifier comprising a housing including a bottom water pan having side walls and a bottom wall and shroud having side walls and a top wall of inverted U-shape configuration with the shroud side walls depending into said pan at two opposite walls thereof; means connecting said pan side walls to said shroud side walls; said shroud having open ends forming an open ended air-flow housing in conjunction with said pan; means for mounting said housing on a duct wall, an evaporator vane and air driven fan water wheel supporting rack insertable in and removable from said housing through the open ends thereof, means on said rack for supporting evaporator vanes thereon, evaporator vanes disposed on said rack means, an axle on said rack parallel with air flow through said housing, an air driven fan water wheel freely rotatably disposed on said axle having radially extending water engaging tips; said fan being driven by air flowing through said housing; said fan in its rotation engaging water in said pan raising portions of water to the top of said shroud, a pivotally mounted inclined roof plate across the top of said shroud between the sides thereof adapted to swing up to provide clearance for inserting and removing said rack from said housing and adapted to swing down when said rack is inserted in said housing and to lie in a location from a point over said fan to a point over said evaporator vanes on said rack with said roof plate slanting downwardly from the point over said pan to the point over said evaporator vanes on said rack; said inclined roof plate receiving water thrown on said roof plate by said fan to drain the water on the evaporator vanes to provide downwardly running water thereon; said rack including top cross bars, a spreader member associated with said rack including legs depending between said rack cross bars, a foot on said legs spaced below said rack cross bars and evaporator vane stripping disposed under said spreader feet and over said cross bars spreading same as an evaporator vane on said rack and spreader, and water supply and water level controlling means on said housing.

2. A forced air humidifier comprising a water pan, a shroud over said pan having open ends, said pan and shroud comprising an air flow housing for channeling air through said shroud over said pan; said housing having the bottom and the ends substantially the same dimensions for selectively fitting into the same attaching frame when a frame is selectively horizontally disposed around an bottom of said housing and vertically disposed around the end of said housing; an attaching frame having an opening of the dimension of said housing bottom and ends for selectively receiving the bottom and either end of said housing for selectively attaching said frame to a supporting wall both vertically and horizontally at the option of the user with the housing in an upright position, and attaching means for securing said housing to said frame in the selected position.

3. A forced air humidifier comprising a water pan, a shroud over said pan having open ends; said pan and shroud comprising an air flow housing for channeling air through said shroud over said pan via the open ends of said shroud; a rack assembly insertable into and removable from said housing over said pan via the open ends of said shroud, evaporator vanes on said rack, an axle on said rack aligned axially parallel with air flow through said housing, a fan water wheel disposed on said axle adapted to be driven by air flowing through said housing; said vanes and fan being insertable and removable with said rack relative to said housing as a unit; and means for supplying water to said pan at a controlled level so as to immerse the bottom of said fan; said fan being adapted to splash water on said housing, rack, and vanes to impart moisture to the air moving through said housing driving said fan.

4. In a device as set forth in claim 3; said rack having top cross bars and feet on said rack below said cross bars, said vanes comprising sinuous strip material stretched over and between said cross bars and said feet.

5. In a device as set forth in claim 3; a roof plate in said housing over said fan leading to a point over said evaporator vanes; said roof plate slanting downwardly from over said fan to said vanes; said roof plate being adapted to receive upwardly flung water from said fan and to drain same on said vanes.

6. In a device as set forth in claim 3; a roof plate in said housing over said fan leading to a point over said evaporator vanes; said roof plate slanting downwardly from over said fan to said vanes; said roof plate being adapted to receive upwardly flung water from said fan and to drain same on said vanes; said roof plate being pivotally mounted to swing upwardly to provide clearance for said rack during insertion and removal of said rack from said housing and to swing downwardly to provide contact with said rack vanes when inserted.

7. In a device as set forth in claim 3, said rack assembly comprising paired spaced horizontal members, cross bars between horizontal members, a spreader having legs depending between said cross bars stringers interconnecting said legs, interconnecting, feet on said legs, an evaporator vane strip disposed over said bars and under said feet in a senuous path; and means attaching said spreader to said rack.

8. An internal assembly for a humidifier housing which is easily insertable and removable as a unit relative to a humidifier housing wherein the humidifier has water in the bottom and air flowing therethrough at least periodically comprising, a rack constituting a supporting frame, said rack being adapted to lie within and across a humidifier housing so that air travelling through the humidifier housing passes said rack, an axle on said rack aligned so as to be axially parallel with air flow through the humidifier housing when said rack is positioned in a humidifier housing, a windmill fan disposed on said axle so as to lie transverse to air flow through a humidifier housing so as to be rapidly rotated therby;

said fan being freely rotatably disposed relative to said rack;

said fan being adapted to contact the water in a humidifier housing bottom to splash same into the air flow during its rapid rotation; and evaporators on said rack adapted to baffle air flow borne splashed water particles thrown into the air flow by said fan from the air flow to prevent raw water particles escaping the humidifier housing;

said rack holding said fan and evaporators in proper relationship to one another prior to and after installation in a humidifier housing, eliminating relative adjustment after installation, and preventing interference between said evaporators and said windmill fan thereby insuring that said windmill fan is clear for rotation.

References Cited in the file of this patent

UNITED STATES PATENTS

| | | |
|---|---|---|
| 872,330 | Cunningham | Dec. 3, 1907 |
| 1,854,569 | Welch | Apr. 19, 1932 |
| 2,175,779 | Mohrdieck | Oct. 10, 1939 |
| 2,217,130 | Niehart | Oct. 8, 1940 |
| 2,858,825 | Skerritt | Nov. 4, 1958 |
| 2,897,815 | Perlman | Aug. 4, 1959 |

FOREIGN PATENTS

| | | |
|---|---|---|
| 280,792 | Italy | Dec. 20, 1930 |